United States Patent [19]

Berlinger et al.

[11] Patent Number: 4,684,779
[45] Date of Patent: Aug. 4, 1987

[54] LASER WELDING METAL SHEETS WITH ASSOCIATED TRAPPED GASES

[75] Inventors: Gregory J. Berlinger, West Lafayette, Ind.; Joseph J. Speranza, Rochester Hills, Mich.

[73] Assignee: General Motors Corporation, Detroit, Mich.

[21] Appl. No.: 910,405

[22] Filed: Sep. 22, 1986

Related U.S. Application Data

[63] Continuation-in-part of Ser. No. 820,967, Jan. 22, 1986, abandoned.

[51] Int. Cl.⁴ .............................................. B23K 26/00
[52] U.S. Cl. ......................... 219/121 LD; 219/121 FS
[58] Field of Search ................. 219/121 LC, 121 LD, 219/121FS, 121 LE, 121 LF

[56] References Cited

U.S. PATENT DOCUMENTS

| | | | |
|---|---|---|---|
| 3,881,084 | 4/1975 | Baardsen | 219/121 LM |
| 4,000,392 | 12/1976 | Banas | 219/121 LM |

FOREIGN PATENT DOCUMENTS

| | | | |
|---|---|---|---|
| 0091893 | 6/1982 | Japan | 219/121 FS |
| 0168490 | 10/1983 | Japan | 219/121 LD |
| 0054489 | 3/1984 | Japan | 219/121 LD |
| 0150683 | 8/1984 | Japan | 219/121 LD |
| 0163092 | 9/1984 | Japan | 219/121 FS |
| 0189095 | 10/1984 | Japan | 219/121 LD |
| 1448740 | 9/1976 | United Kingdom | 219/121 LD |

*Primary Examiner*—C. L. Albritton
*Attorney, Agent, or Firm*—Robert M. Sigler

[57] ABSTRACT

A method is disclosed for laser welding two sheets of metal, the metal being of the type having associated gases tending to be trapped and expand in the weld zone during welding due to heat from the laser. These expanded gases tend to separate the upper and lower portions of the weld zone and/or expand through the weld zone toward the laser beam to create porosity in the final weld. Such metal may be coated, such as galvanized steel, in which case the zinc vaporizes into a gas in the weld zone between the adjacent sheets, or it may be poorly fitting sheets, in which case air is trapped in surface irregularities between the sheets. In either case, the method adds to the standard laser beam a surrounding stream of pressurized shield gas effective to create a pressure at the surface of the weld zone sufficient to force the molten metal of the two sheets together and force the expanded associated gases out of the weld zone in a direction away from the laser beam, whereby a non-porous weld may be created. The pressure is higher than that of shield gas in the prior art used for protection from oxygen or dispersal of plasma. Specific pressure ranges are disclosed for argon and helium.

3 Claims, 2 Drawing Figures

U.S. Patent  Aug. 4, 1987  4,684,779

LASER WELDING METAL SHEETS WITH ASSOCIATED TRAPPED GASES

BACKGROUND OF THE INVENTION

This application is a continuation-in-part of U.S. Ser. No. 820,967, filed Jan. 22, 1986 now abandoned and assigned to the assignee of this application.

This invention relates to the laser welding of sheets of metal having associate trapped gases in the weld zone between the adjacent surfaces of the sheets due to the heat of the laser, which gases tend to prevent joining of the molten metal between the adjacent surfaces and further tend to expand through the weld zone toward the laser beam and create porosity in the final weld. There are at least two specific welding situations where this tends to occur. The first is the case of sheets of metal having poorly fitting surfaces, wherein air remains in the surface irregularities between the adjacent surfaces when they are placed together for welding and this air is trapped in the weld zone and expanded by the heat from the laser. The second is the case of coated metal, wherein the coating on the adjacent surfaces is vaporized by the laser to form a gas. A specific example of the latter is the welding of galvanized metal.

In the prior art, galvanized or other coated metal surfaces to be welded have been stripped of their coating or provided with an additional coating before welding to prevent weakening of the weld due to gas percolation through the weld zone. An example of this prior art is seen in the U.S. Pat. No. 3,881,284, to Baardsen issued Apr. 29, 1975. In the case of poorly fitting metal surfaces, such welding has been restricted to surfaces having an air gap measuring less than ten percent of the thickness of the metal sheets to be welded. In either case, extra cost is involved in the extra processing or scrapping of the metal sheets. It is desirable, both for economic reasons and to improve the quality of resulting products, to provide laser welding methods which operate on all desired metal surfaces with minimal or no prior processing and produce good welds, unweakened by gases trapped in the weld zone.

In addition, it is well known in the prior art to use a shield gas at the surface of the metal struck by the laser beam in order to prevent the ionization of the air by the laser beam and to prevent the oxidation of the moten metal. However, the common practice is to apply the shield gas at comparatively low pressures. There is prior art, in the U.S. Pat. No. 4,000,392, to Banas et al issued Dec. 28, 1976, which recognizes the problem of impurities in the weld zone leading to porous or otherwise impure welds and further uses a shield gas for the usual reasons mentioned above. Banas et al disclose that the shield gas is carefully controlled so as to allow the gaseous impurities to work their way through and out of the weld zone by their own vapor pressure. However, this method will not work where there is a much larger supply of associated gas created or trapped between the adjacent sheets which expands through the weld zone during welding. The amount of gas is then too great and cannot be completely expelled in this manner in the limited welding time.

SUMMARY OF THE INVENTION

The shortcomings of the prior art are overcome in a method of laser welding two sheets of metal having associated gases expanded in the weld zone during welding by heat from the laser comprising the following steps: placing the sheets of metal with adjacent surfaces in position for welding, directing a laser beam at one of the sheets of metal to create a weld zone of moten metal extending through the one sheet of metal and at least into the other sheet of metal and directing a stream of pressurized shield gas at the weld zone, the stream surrounding and being parallel to the laser beam and creating pressure on the surface of the weld zone, the pressure on the surface of the weld zone being sufficient to force the molten metal of the two sheets together and force the expanded associated gases out of the weld zone in a direction away from the laser beam, whereby a non-porous weld may be created.

In the case of poorly fitting metal sheet surfaces, the trapped gas is air caught in the surface irregularities of the metal, which is forced from its trapped position between the upper and lower portions of the weld zone and exits between the adjacent surfaces of the sheets. In the case of coated metal such as galvanized steel, the trapped gas is the coating material vaporized from the metal surface by the heat of the laser, which is prevented from percolating up through the weld zone. The method is found to be the same for both cases, as is the pressure of the shield gas, which is higher than the pressure of shield gas used in the prior art for such purposes as plasma dispersion or protection of the weld zone from oxygen in the surrounding air. An additional benefit of the method which might also apply to welding of uncoated, well fitting sheets of metal is a possible improvement in weld speed, since the welding process does not have to wait for the vapor pressure of trapped gases to advance them up through the weld zone to the surface thereof but the positive pressure from above forces them out between the sheets being welded. Further details and advantages of this invention will be apparent from the accompanying drawings and following description of preferred embodiments.

DESCRIPTION OF THE PREFERRED EMBODIMENTS

Figure 1:
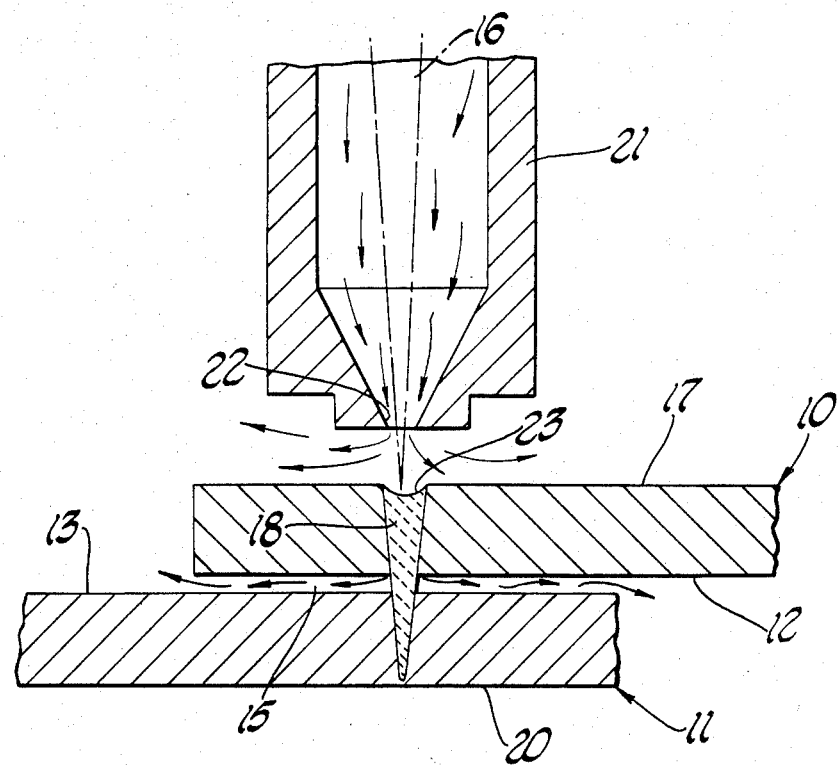
FIG. 1 shows an example of the method of the invention applied to the welding of sheet metal with poorly fitting surfaces.

Referring to FIG. 1, a first sheet 10 of metal such as steel is placed adjacent a second sheet 11 of the same or a similar metal for welding. Sheets 10 and 11 have surfaces 12 and 13, respectively, which are to be joined by the weld. Sheets 10 and 11 are understood to fit poorly when placed in an overlapped position for welding with surfaces 12 and 13 supposedly together so that surfaces 12 and 13 are actually maintained slightly spaced over a significant portion of their areas. The result is an air gap 15 between sheets 10 and 11 over a significant portion of their overlap, as shown in FIG. 1, even though the sheets are nominally placed together with adjacent surfaces touching.

Laser welding apparatus according to this invention includes conventional laser beam generating and focusing apparatus, not shown, which creates a laser beam 16 and directs it, suitably focused, at the upper surface 17 of sheet 10 opposite surface 12. Laser beam 16 generates heat sufficient to melt a portion of sheets 10 and 11 in a weld zone 18, which extends completely through sheet 10 and well into sheet 11. Laser beam 16 is controlled, relative to the material and apparatus parameters such as melting point, sheet thickness, distance of laser, etc. to produce a weld zone 18 of molten metal which ideally just reaches the lower surface 20 of sheet 11 and does not cut the sheets 10 and 11 but melts sufficient metal to form a locking weld nugget when the metal cools.

However, the heat generated by laser beam 16 in and near the weld zone is also effective to expand the air in gap 15 at weld zone 18 between sheets 10 and 11. The rapid expansion of this gas does not allow easy immediate escape outward from between sheets 10 and 11, so it tends to be temporarily trapped in weld zone 18 and tends to separate the weld zone into upper and lower portions. A complete weld nugget is not allowed to form, since the trapped air separates the molten metal in the upper and lower portions of the weld zone. In addition, the expansion of the air upward in the Figure, toward the laser beam, would be allowed with atmospheric pressure on an upper surface 23 of the weld zone. This air would tend to be trapped in weld zone 18 as it cooled into a weld nugget and thus create porosity and resulting weakness in any weld that did form.

Therefore, the weld apparatus includes a nozzle 21 surrounding laser beam 16 and having an opening 22 through which laser beam 16 passes and which also emits a shield gas under pressure. The shield gas may be any gas which is commonly used or may be used in the future to shield the weld zone from oxidizing substances or weld harming impurities in the air and which prevents plasma formation in the air. Examples are inert gases such as argon and helium, as well as such more common gases as carbon dioxide or nitrogen. Other gases will be apparent to those skilled in the art. The shield gas forms a stream surrounding laser beam 16 which is directed against the upper surface 23 of weld zone 18. Such gas streams and nozzles are not new in the welding art. However, they have been used in the past at low pressures to protect the weld zone from oxygen in the atmosphere or to disperse the heat absorbing plasma created at the weld zone. This gas stream is distinguished by its higher pressure at the surface 23 of the weld zone. For helium, the range of pressures producing the desired result has been determined to be 1.35 torr (mm of Hg) to 6.35 torr at weld zone surface 23. For argon, the range of pressures is 12.3 torr to 18.0 torr. These downward pressures at surface 23 create sufficient internal pressure in weld zone 18 to force the upper and lower portions of molten metal in weld zone together in gap 15 and force the trapped air out of the weld zone through gap 15 between sheets 10 and 11 as indicated by the arrows in gap 15. The high downward pressure also prevents the trapped air from expanding through weld zone 18 upward in the direction of laser beam 22. This is to be contrasted with the prior art, in which the gaseous impurities in the weld zone would be allowed to expand their way up and out of the weld zone with the expectation that the process would essentially purify the weld zone during the time of welding. In addition, the use of the high pressure also speeds the process of weld zone purification from the more rapid egress of the associated gases. This is aided both by the pressure itself, which creates faster gas movement, and the fact that the gas exits between the sheets to be welded rather than at surface 23 and thereby traverses a shorter path through the weld zone.

Tests on the welding method of FIG. 1 indicate that the gap 15 may have a thickness up to 50 percent of the thickness of the upper sheet 10 with a good weld produced. This contrasts with a maximum of 10 to 15 percent in the prior art.

Figure 2:
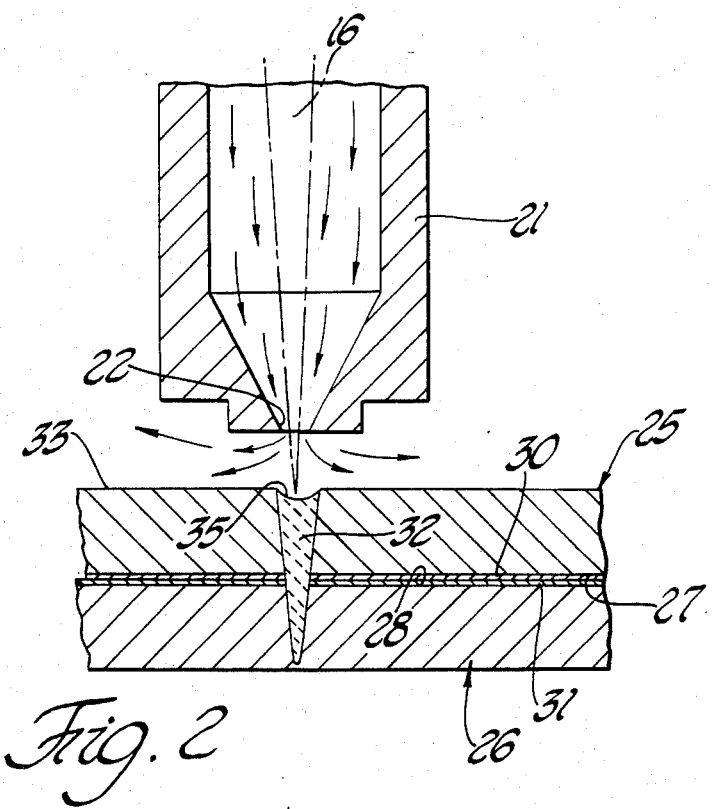
FIG. 2 shows an example of the method of the invention applied to the welding of coated sheet metal.

Referring to FIG. 2, the welding apparatus is identical, with resulting laser beam 16 and nozzle 21 having opening 22 as in the embodiment of FIG. 1. A first sheet 25 of coated metal such as galvanized steel is placed adjacent a second sheet 26 of the same or a similar metal for welding. Sheets 25 and 26 have adjacent surfaces 27 and 28, respectively, with zinc coatings 30 and 31, respectively, which are to be joined by the weld. Sheets 25 and 26 may fit well when placed in an overlapped position for welding with adjacent surfaces 27 and 28, but the zinc coatings 30 and 31 are thus sandwiched between sheets 25 and 26. Laser beam 16 is directed perpendicularly at upper surface 33 of sheet 25 opposite surface 27 and creates a weld zone 32 of molten metal with an upper surface 35, weld zone 32 extending completely through sheet 25 and substantially through sheet 26.

The heat generated by laser beam 16 in and near weld zone 32 is also effective to vaporize the zinc of coatings 30 and 31 in and adjacent weld zone 32, since zinc has a comparatively low vaporization temperature. The vaporized zinc gas is trapped by sheets 25 and 26 as it expands due to the heat; and it attempts to enter the weld zone 32 and expand or percolate upward through the molten metal. If this were allowed, the weld nugget, when cooled and hardened, would be porous, due to the trapped gas. However, the stream of pressurized shield gas from nozzle 21 creates pressure in weld zone 32 sufficient to suppress this gas and prevent it from expanding through weld zone 32. Instead, the gas is forced out between sheets 25 and 26 or, possibly, downward and out through sheet 26. The ranges of pressures at surface 35 of weld zone 32 for helium or argon are identical to those for the same shield gases at surface 23 of weld zone 18 in the embodiment of FIG. 1. Other shield gases may have different pressure ranges for effective operation; but these may be easily determined in experiment by those skilled in the art.

In the use of the method of this invention, regardless of whether the use is for poorly fitting surfaces or for coated metal surfaces, the correct pressure range of the shield gas at the surface of the weld zone is critical for successful operation. Pressures lower than the desired range, as in the prior art, are not effective to force the trapped gas from the weld zone; while pressures higher than the range tend to blow the molten metal out of the weld zone and thus cut the material rather than weld it. It does not matter how the pressure is achieved: by a higher pressure shield gas stream from a more distant nozzle or a lower pressure shield gas stream from a closer nozzle. Also, specific nozzle design seems to make little difference, as long as the required pressure is achieved at weld surface 23. Many different nozzle designs have been tried with success.

The embodiments of the invention in which an exclusive property or privilege is claimed are defined as follows:

1. A method of laser welding two sheets of metal galvanized with a coating of zinc, the zinc coating being subject to vaporization in the weld zone at the adjacent surfaces of the sheets into a gas by the heat of the laser and tending to expand through the weld zone, the method comprising the following steps:

placing the sheets of metal with coated surfaces adjacent in position for welding;

directing a laser beam at one of the sheets of metal to create a weld zone of molten metal extending through the one sheet of metal and at least into the other sheet of metal, the heat of the laser beam tending to vaporize the zinc coating into an expanding gas in the weld zone at the adjacent surfaces of the sheets, the expanding gases tending to prevent joining of the molten metal at the adjacent surfaces of the sheets and migrate through the weld zone toward the laser beam to create porosity in the final weld;

directing a stream of pressurized shield gas at the weld zone, the stream surrounding and being parallel to the laser beam and creating pressure on the surface of the weld zone, the pressure on the surface of the weld zone being sufficient to force the molten metal of the two sheets together and force the expanded gas out of the weld zone in a direction away from the laser beam, whereby a non-porous weld may be created.

2. The method of claim 1 in which the shield gas is helium and the pressure at the weld surface is in the range of 1.35 to 6.35 torr.

3. The method of claim 1 in which the shield gas is argon and the pressure at the weld surface is in the range of 12.3 to 18.0 torr.

* * * * *